(12) United States Patent
Zinoni et al.

(10) Patent No.: US 7,900,791 B2
(45) Date of Patent: Mar. 8, 2011

(54) CONTAINER FOR A WATER TREATMENT DEVICE AND MANUFACTURING METHOD OF SAID CONTAINER

(75) Inventors: Francesco Zinoni, San Gervasio Bresciano (IT); Lorenzo Bertoli, Cignano Di Offlaga (IT)

(73) Assignee: Hydro System Treatment S.r.l., San Gervasio Bresciano (IT)

( * ) Notice: Subject to any disclaimer, the term of this patent is extended or adjusted under 35 U.S.C. 154(b) by 673 days.

(21) Appl. No.: 11/569,313

(22) PCT Filed: Aug. 13, 2004

(86) PCT No.: PCT/IT2004/000461
§ 371 (c)(1),
(2), (4) Date: Nov. 17, 2006

(87) PCT Pub. No.: WO2006/016385
PCT Pub. Date: Feb. 16, 2006

(65) Prior Publication Data
US 2007/0227598 A1    Oct. 4, 2007

(51) Int. Cl.
*B65D 21/02*    (2006.01)
(52) U.S. Cl. .................................................... 220/23.83
(58) Field of Classification Search ............... 220/23.86,
220/23.89, 4.33, 507, 4.16, 4.13, 4.12, 4.27,
220/4.26, 4.05, 4.04, 4.08, 602, 523, 4.01,
220/500, 600, 628, 630, 729, 694; 210/650,
210/321.6; 137/599.15; D9/737, 719, 715
See application file for complete search history.

(56) References Cited

U.S. PATENT DOCUMENTS

| | | | | |
|---|---|---|---|---|
| 1,685,816 A * | 10/1928 | Kenney | .......................... | 210/191 |
| 1,976,622 A * | 10/1934 | McIntyre | ..................... | 220/23.4 |
| 2,078,203 A * | 4/1937 | Manning | ........................ | 261/75 |
| 2,511,707 A * | 6/1950 | Gibbons et al. | ............... | 220/23.4 |
| 2,700,458 A * | 1/1955 | Brown | .......................... | 206/319 |
| 3,233,732 A * | 2/1966 | Lung et al. | ................... | 210/138 |
| 3,326,377 A * | 6/1967 | Abos | ............................. | 210/126 |
| 3,454,179 A * | 7/1969 | Kerr | ............................ | 220/4.21 |
| 3,658,204 A * | 4/1972 | Bottger | ........................ | 220/23.4 |
| 3,912,103 A * | 10/1975 | Gerhard | ........................ | 220/1.5 |
| 4,271,965 A * | 6/1981 | Brambley et al. | ............. | 206/219 |
| 4,553,561 A * | 11/1985 | Morris | .......................... | 137/362 |
| 4,695,375 A * | 9/1987 | Tyler | ............................ | 210/110 |
| 4,752,389 A * | 6/1988 | Burrows | ....................... | 210/181 |
| 4,804,465 A * | 2/1989 | Brown | .......................... | 210/136 |
| 4,880,535 A * | 11/1989 | Burrows | ....................... | 210/181 |
| 5,096,574 A * | 3/1992 | Birdsong et al. | ................ | 210/90 |
| 5,154,307 A * | 10/1992 | Hauk | ........................ | 220/495.06 |
| 5,290,442 A * | 3/1994 | Clack | .......................... | 210/257.1 |
| 5,402,903 A * | 4/1995 | Mann | ............................ | 220/23.6 |
| 5,427,262 A * | 6/1995 | Hanson et al. | ............... | 220/23.4 |

(Continued)

FOREIGN PATENT DOCUMENTS

GB    1375709    11/1974

*Primary Examiner* — Anthony Stashick
*Assistant Examiner* — Robert J Hicks
(74) *Attorney, Agent, or Firm* — Shoemaker and Mattare (57) ABSTRACT

A container of a water softening plant, comprises a first shell with a first chamber suitable for holding a brine solution and a second shell with a second chamber, separated from the first chamber, suitable for housing a tank, so keeping the tank separate from the mixture. The first shell and/or the second shell are manufactured by blow moulding.

6 Claims, 6 Drawing Sheets

U.S. PATENT DOCUMENTS

| | | | |
|---|---|---|---|
| 5,597,085 A * | 1/1997 | Rauworth et al. | 220/581 |
| 5,628,899 A * | 5/1997 | Vaughan | 210/142 |
| 5,638,974 A * | 6/1997 | Mann | 220/23.4 |
| 6,099,735 A * | 8/2000 | Kelada | 210/652 |
| 6,412,650 B1 * | 7/2002 | Warner | 220/4.12 |
| 2004/0129617 A1 * | 7/2004 | Tanner et al. | 210/110 |
| 2005/0011853 A1 * | 1/2005 | Brugger | 215/10 |

* cited by examiner

CONTAINER FOR A WATER TREATMENT DEVICE AND MANUFACTURING METHOD OF SAID CONTAINER

BACKGROUND OF THE INVENTION

1. Field of the Invention

The present invention refers to a container for a plant for a water treatment plant, for example a plant for the decalcification of water supplied by a water conduit.

2. Description of the Prior Art

Plants for the treatment of water supplied by the water network, from a water conduit for example, are becoming more and more widely used, both for domestic and industrial uses.

For example, more and more often, homes or apartment blocks are fitted with such a plant, for example with the aim of decalcifying water or in any case modifying its physical and chemical properties to make it more suitable for use as drinking water.

Similarly, in industry, the water supplied from the water network or extracted from rivers, lakes or the sea, is treated before being used in a particular production cycle, in order to make it more suited to such a cycle.

Water treatment plants are fitted above the domestic or industrial distribution network and generally comprise a tank containing water and a group of organic resins, known as a filter bed, whose composition is related to the specific treatment to which the water must be subjected.

One embodiment of a tank of a water treatment plant is described in the international application PCT/IT2004/000182 in the name of the same Applicant.

The tank is generally housed in a container and is partially immersed in a brine solution formed of salt and pre-treated water.

Although the tank's covering is made in highly biocompatible materials, designed not to release any substance which is harmful to humans when in contact with the brine solution contained in the container, it has been found that the users of such plants consider the fact that the brine solution is in contact with the covering of the tank is not very hygienic.

SUMMARY OF THE INVENTION

The aim of the present invention is to create a container for the tank of a water treatment plant where the tank, and in particular its covering, is not in contact with the brine solution held in the container.

This aim is achieved by a container as described below.

BRIEF DESCRIPTION OF THE DRAWINGS

The characteristics and advantages of the container according to the present invention will be evident from the following description of an exemplary embodiment, given by way of a non-limiting example, in accordance with the attached drawings, in which.

DESCRIPTION OF THE PREFERRED EMBODIMENT

In accordance with the attached figures, reference numeral 1 globally refers to a container according to the present invention.

Container 1 comprises a first shell 2 with a first chamber 4 adapted to hold a brine solution formed of a mixture of salt and pre-treated water.

Generally, the salt is in tablet form and is suitable for use in water softeners.

Further, container 1 comprises a second shell 6 with a second chamber 8, designed to house the tank.

The first shell 2 has an extension along a vertical axis X-X and comprises a front wall 10, with a largely arched shape, for example semi-cylindrical.

Further, the present first shell 2 comprises a rear wall 12, fitted to said front wall 10, and designed to be coupled to said second shell 6 of the container 1.

In a preferred embodiment, said rear wall 12 comprises a raised section 14, preferably jutting out externally in relation to the first chamber 4.

The second shell 6 has an extension along a vertical axis Y-Y and a cross section, in other words a section which may be highlighted via a surface at right angles to said vertical axis Y-Y, with an external border with a substantially polygonal shape, for example quadrangular, square or rectangular.

The second shell 6 comprises a front wall 16 designed to be joined with the first shell 2.

According to the preferred embodiment, said second shell 6 comprises a pair of angular elements 18, 20, joined to said front wall 16 and arranged at an angle to said quadrangular section.

Preferably, said angular elements 18, 20 jut out in relation to the second chamber 8 of the second shell 6.

In other words, container 1 comprises coupling means adapted to link said first shell 2 to said second shell 6.

Said coupling means comprise the raised section 14 of the rear wall 12 of the first shell, and the angular elements 18, 20 of the front wall 16 of the second shell.

Said coupling means, according to the preferred embodiment, are releasable.

Said coupling means are suitable for joining said first shell to said second shell by reciprocal sliding, for example following a parallel direction to said vertical axes.

Said coupling means are means suitable for achieving a shape coupling.

As may be seen, the second chamber 8 of container 1, designed to house the tank, is separated from the first chamber 4, designed to contain the brine solution, keeping the tank away from said brine solution.

Further, it may be seen that container 1 comprises reinforcement means designed to reinforce said first shell 2 to counter the action of the brine solution, due to its weight, which tends to widen the walls of said first shell, in particular its front wall 10.

Said reinforcement means comprise the rear wall 12 of the first shell 2 which, joined to its front wall, creates a transverse wall which counters the action of the brine solution.

In other words, the rear wall 12 extends along a direction which is the direction along which the action of the brine solution transmits from the front wall 10 to the rear wall 12.

Said rear wall is therefore positioned in traction along this direction and counters said action by virtue of its own mechanical properties.

Further, said reinforcement means comprise said front wall 10 of the first shell 2, advantageously made according to an arched configuration, giving it notable structural rigidity.

In a preferred embodiment, container 1 comprises at least one covering element 30.

This covering element is suitable for being fitted onto the first shell 2 and on the second shell 6, preferably at the same time.

Advantageously, said covering element helps to reinforce said first shell 2.

Figure 1:
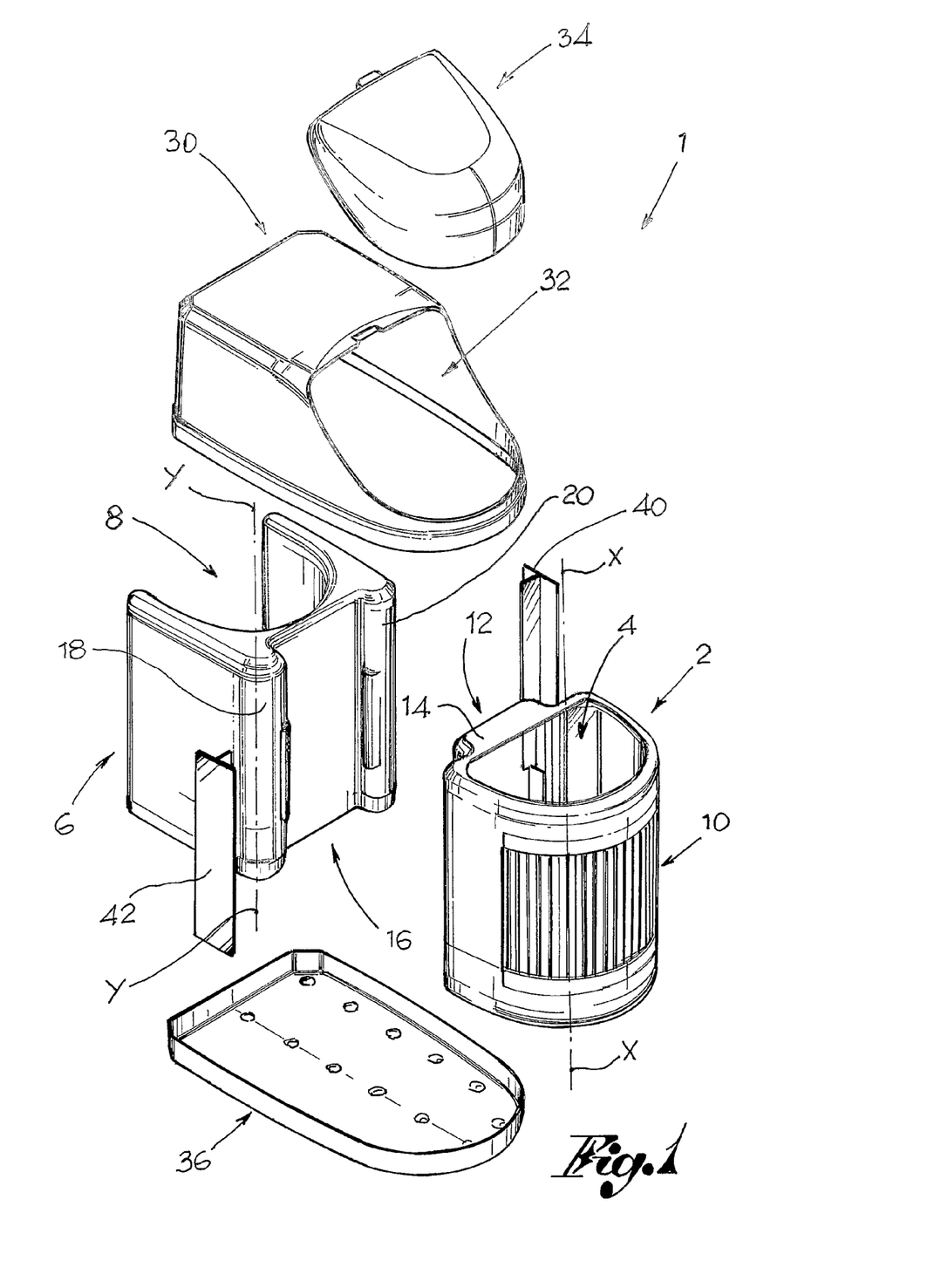
FIG. 1 shows an axonometric view, with separate parts, of a container in accordance with the present invention.
Figure 2:
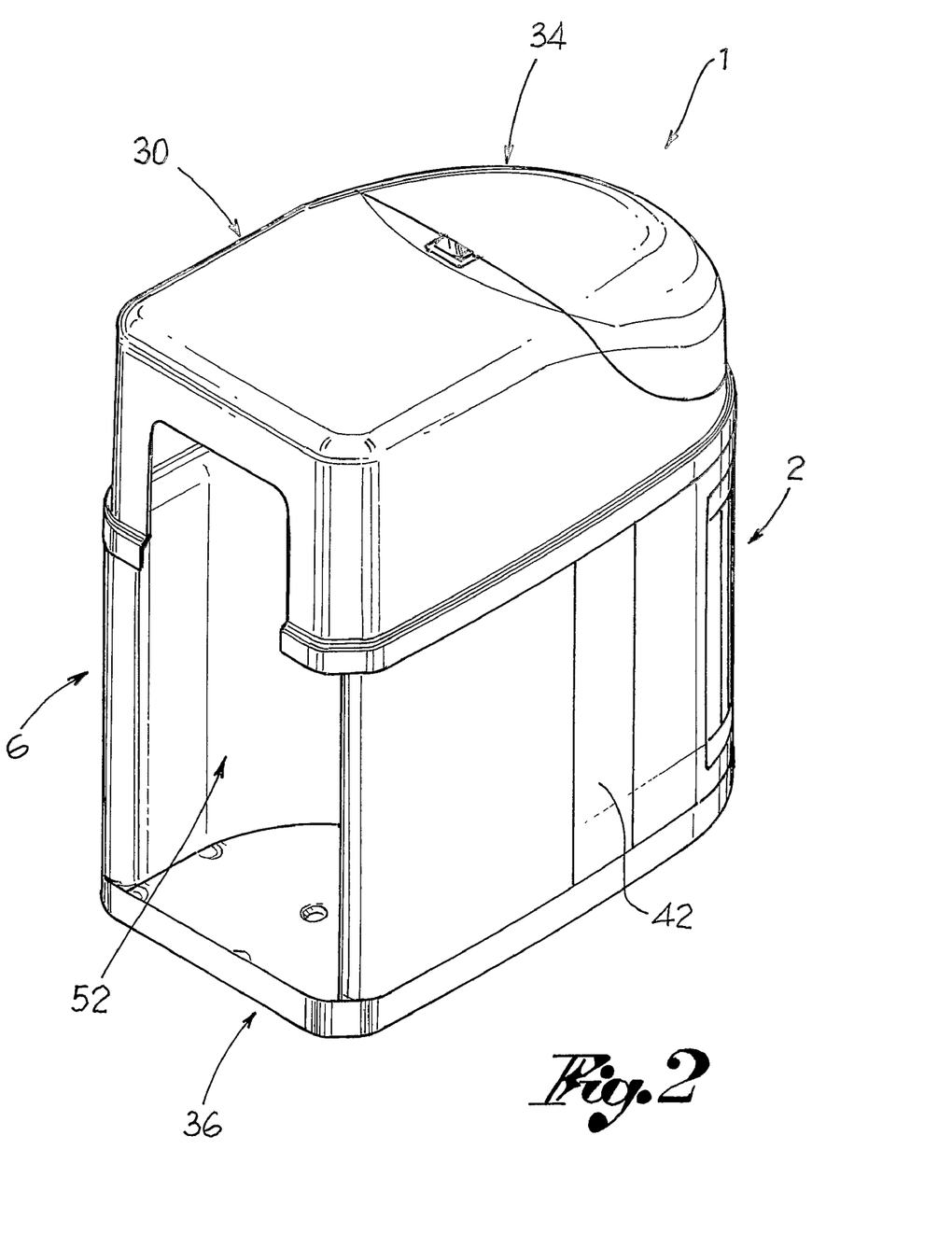
FIG. 2 shows an axonometric view, with assembled parts, of the container in FIG. 1.
Figure 5:
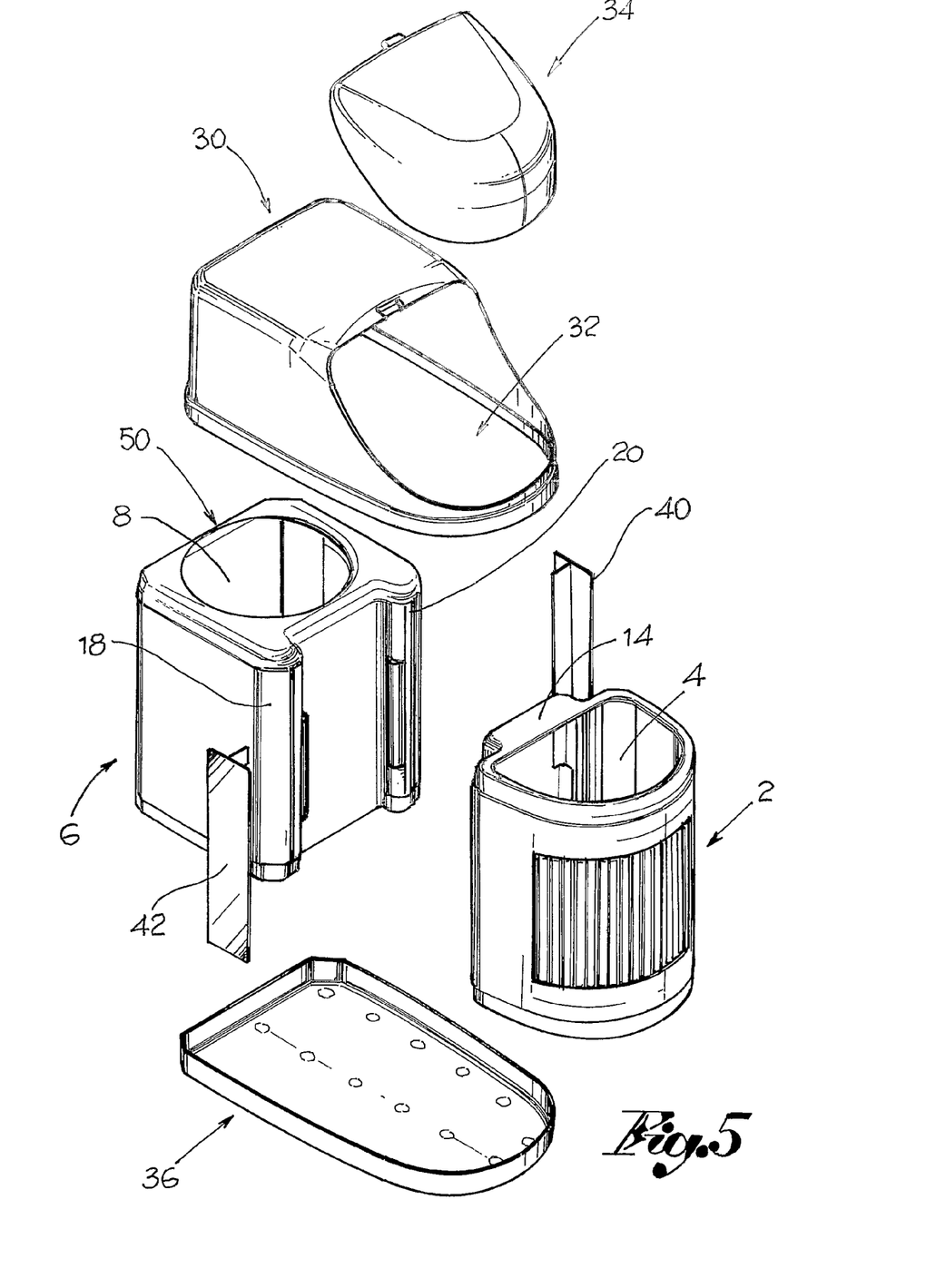
FIG. 5 shows an axonometric view with separate parts of a container in accordance with the present invention, in a further embodiment.

In one embodiment, the covering element 30 has an inspection hole 32 designed to make the first chamber 4 of the first shell 2 visible (FIGS. 1 and 5).

In said embodiment, the container 1 comprises protection 34 associable to this inspection hole 32 of the covering element 30.

Said protection 34 is made from a material suitable for allowing inspection of the first chamber of the first shell when the protection is joined to the covering element.

Figure 7:
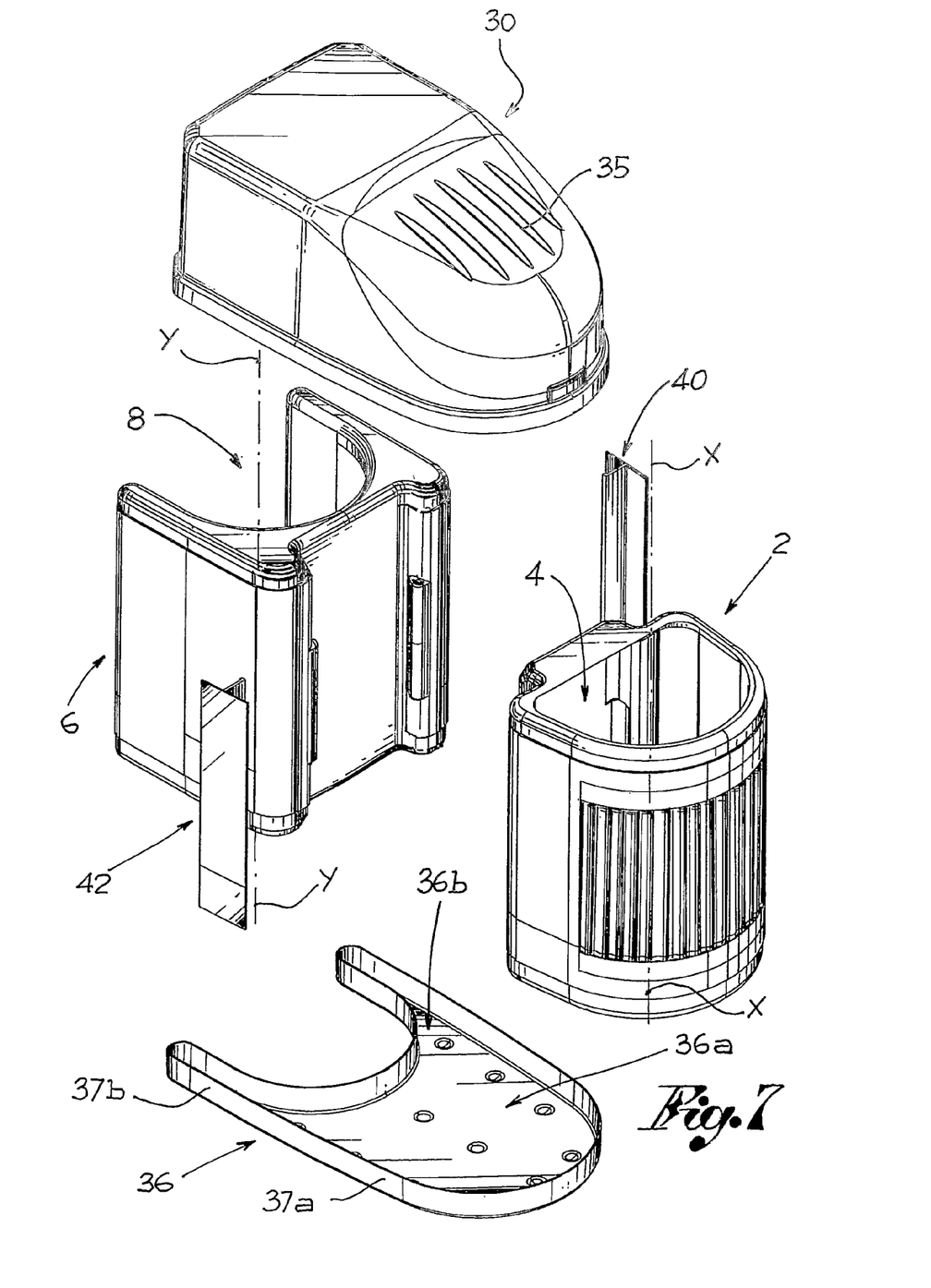
FIG. 7 shows an axonometric view with separate parts of a container in accordance with the present invention, in a further embodiment.

In yet another embodiment, the covering element 30 has no inspection hole (FIG. 7).

In said embodiment, said covering element comprises, at the front, several ribs 35, suitable for making the shape of said covering element more attractive.

In yet another embodiment, the container 1 comprises a base 36 designed to support said shells 2, 6.

In a preferred embodiment, this base 36 is moulded as the support sections for the first shell 2 and for the second shell 6 (FIG. 7).

In other words, in this embodiment, the base 36 comprises a front pocket 36a, suitable for accommodating the first chamber 2, said front pocket being fitted with a raised edge 37a with a similar shape to that of the section of the first chamber 2 intended to be accommodated in said pocket.

Further, the base 36 comprises a rear pocket 36b, designed to accommodate the second chamber 6, said rear pocket being provided with a raised edge 37b with a similar shape to that of the section of the second chamber 6 intended to be accommodated in such pocket.

Advantageously, said moulded base 36 facilitates connection between the first and second chambers.

According to a preferred embodiment, said container comprises at least one connection element designed to create a flat connection between the wall of the first shell and the wall of the second shell.

In particular, said container comprises a pair of connection elements 40, 42, suitable for being mounted to the sides of the container, in the connection area between the first and second shell, to create a flat connection between its walls.

Said connection elements cooperate with said base 36 and said covering element 30 to achieve a stable connection between the first and second shell.

In an alternative embodiment, said shell 6 comprises a closing wall 50, arranged on the side which is not of said second shell 6 and not joinable to the first shell 2, to mark out the perimeter of the second chamber 8.

Figure 6:
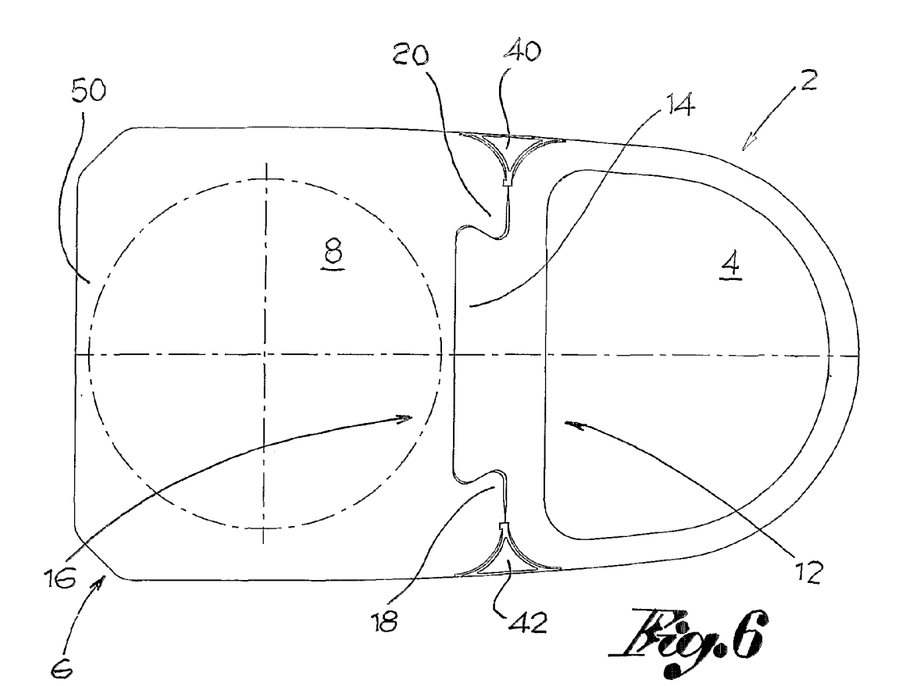
FIG. 6 shows a cross section of the container in FIG. 5.

In other words, in said variant, the container appears closed from behind by the closing wall 50 (FIGS. 5 and 6).

Figure 3:
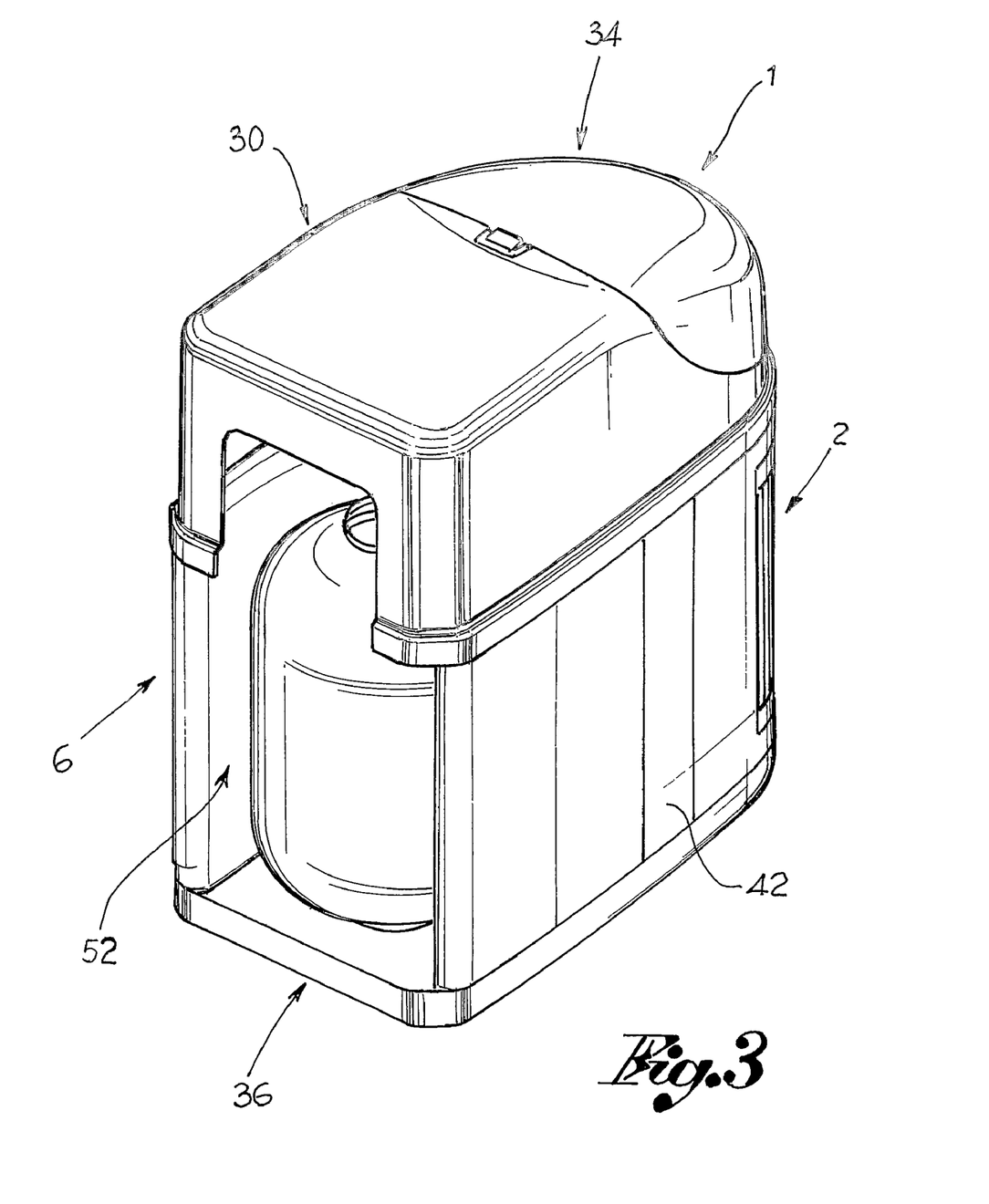
FIG. 3 shows an axonometric view of the container in FIG. 1 connected to a tank.
Figure 4:
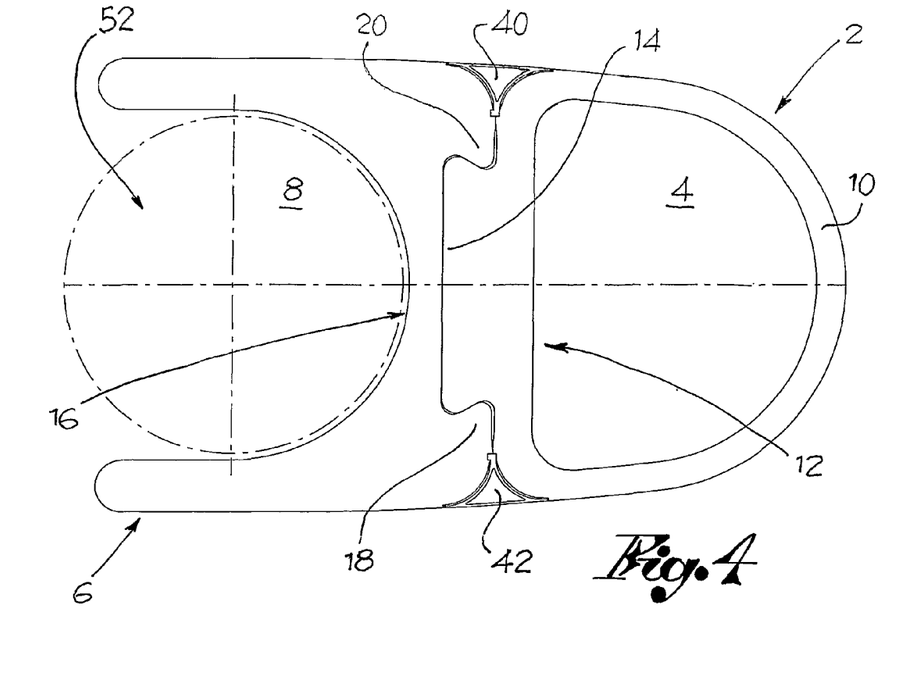
FIG. 4 shows a cross section of the container in FIG. 1.

However, it may be noted that in further alternative embodiments, the second chamber 6 presents, in correspondence with the wall 50, an opening 52 suitable for moving the container 1, in particular for transferring it, allowing the tank of the second chamber 8 to be taken out, without disconnecting said tank from the water supply (in particular, FIGS. 3 and 4).

Container 1 may be manufactured via a production method comprising the step of creating at least one of said shells 2, 6 by blow moulding.

Said step of creating at least one of the two shells by blow moulding comprises the step of introducing a tubular element in flexible material between the mould and the die to carry out said blow moulding.

Said step of creating at least one of the two shells via blow moulding comprises the step of positioning said mould and said die between them, forming a cavity within them which accommodates a section of said tubular element.

Said step of creating at least one of the two shells by blow moulding comprises the step of expanding said section of tubular element against the walls of said cavity.

Said expansion step comprises a step of blowing an gaseous fluid, air for example, into said cavity to expand said section of tubular element against the walls of said cavity.

During the normal functioning of a water treatment plant, for example a softening plant, the fluid in the tank is connected to the water supply network, for example connected to the water conduit.

The tank contains a group of resins, known as a filter bed, designed to carry out the desired treatment on the water.

Water is introduced into the tank through a valve positioned at the mouth of the tank and is deposited in an upper area positioned above the filter bed.

Passing through the filter bed, the water is treated and passes to a lower area of the tank, below the filter bed.

From the lower area, the treated water is taken from a tube connected to the valve and sent to the service distribution network.

The tank is housed in the second chamber 8 of the container 1, while the first chamber 4 contains a pre-defined quantity of salt, generally in tablet form, of the type suitable for softeners, and a quantity of water, thus creating a brine solution.

Periodically, for example after a pre-defined time interval or after a pre-defined volume of water has been introduced into the tank, the valve carries out a cycle of regenerating the filter bed, in other words a plant maintenance operation.

In other words, the valve extracts a pre-defined quantity of salt water from the brine solution and discharges it to the lower area of the tank, below the filter bed.

The salt water is forced through the filter bed, towards the upper area, regenerating the filter bed.

From said upper area, the valve extracts the salt water which has carried out the regeneration and discharges it outside the plant.

Periodically, for example after a pre-defined time interval or after a pre-defined volume of water has been introduced into the tank, the valve at the mouth of the tank extracts a pre-defined amount of treated water from the lower area of the tank, and discharges it into the first chamber 4, to maintain the mixture of water and salt which will form the brine solution.

Unusually, the container according to the present invention allows the tank to be kept separate from the brine solution, giving the user a favourable impression of the hygienic conditions in which the plant operates.

According to a further advantageous aspect, the container, and in particular the chamber containing the brine solution, although being filled with water and salt, does not display noticeable displacement of the walls, giving a sensation of compactness and resistance to the container.

According to yet another advantageous aspect, the first chamber can easily be separated from the second chamber containing the tank, to carry out cleaning operations for example.

This advantageous aspect, in other words, facilitates maintenance of the plant in which the container is fitted, without having to dismantle said plant.

As a further advantage, moreover, the whole container may be moved without disconnecting the tank from the water supply.

According to a further advantageous aspect, the chamber containing the brine solution may be inspected from outside, to decide when it is necessary to add further salt to the brine solution.

According to yet another advantageous aspect, the container or some of its parts may be manufactured in accordance with a production method allowing the quantity of material used to be reduced, to obtain the desired shapes for coupling and to reduce the times, and therefore the costs, of production.

The invention claimed is:

1. A water treatment plant comprising a water tank and a container for housing said water tank, said container comprising
    a first shell defining a first chamber suitable for holding a brine mixture to carry out a maintenance cycle of said plant, said first shell having a front wall having an arched shape and a transverse rear wall interconnecting sides of the front wall to reinforce said first shell and
    a second shell defining a second chamber, separate from the first chamber, said second chamber having an opening to removably receive said water tank, and to keep the water tank separate from the brine mixture,
    said first shell having a vertically extending protrusion rearwardly from said rear wall, and said second shell having a recess with a shape complementary to that of said protrusion, for slidably receiving said protrusion when the first and second shells are relatively moved in a vertical direction,
    a covering element joinable with and conforming to the upper ends of said first shell and said second shell, and
    a base which receives and conforms to the lower ends said first shell and said second shell.

2. A water treatment plant according to claim 1, where said second shell comprises, at the level of the side joinable to said first shell, a pair of angular elements to be joined to said first shell.

3. A water treatment plant according to claim 1, wherein said covering element comprises an inspection hole for allowing the first chamber of the first shell to be viewed.

4. A water treatment plant according to claim 3, further comprising a closure for covering said inspection hole of said covering element.

5. A water treatment plant according to claim 1, where said opening is formed at the level of a rear wall of said second shell and is suitable for allowing exit from the tank of the second chamber via movement of said container without disconnecting the tank from a water supply.

6. A water treatment plan according to claim 1, wherein said base has a raised edge forming a front pocket for receiving said first shell and a rear pocket for receiving said second shell, said pockets conforming in shape to the shape of said respective shells.

* * * * *